United States Patent [19]

Bihuniak et al.

[11] 4,028,124

[45] June 7, 1977

[54] METHOD OF ENHANCING THE REFRACTORINESS OF HIGH PURITY FUSED SILICA

[75] Inventors: Peter P. Bihuniak, Corning; Donald L. Guile, Horseheads, both of N.Y.

[73] Assignee: Corning Glass Works, Corning, N.Y.

[22] Filed: Apr. 26, 1976

[21] Appl. No.: 680,451

[52] U.S. Cl. .................................. 106/69; 106/73.5
[51] Int. Cl.² ........................................ C04B 35/14
[58] Field of Search ..................... 106/52, 69, 73.5; 423/335, 338, 339

[56] References Cited

UNITED STATES PATENTS

| | | | |
|---|---|---|---|
| 3,370,921 | 2/1968 | Wagstaff | 106/69 |
| 3,848,152 | 11/1974 | Schultz | 106/52 |

*Primary Examiner*—J. Poer
*Attorney, Agent, or Firm*—Milton M. Peterson; Clinton S. Janes, Jr.; Clarence R. Patty, Jr.

[57] ABSTRACT

A method is disclosed wherein high purity fused silica is produced from a liquid flowable form of a silica slurry or sol and the refractoriness of the fused silica is enhanced by homogeneously doping the silica with a selected metal oxide in conjunction with elemental silicon.

9 Claims, No Drawings

METHOD OF ENHANCING THE REFRACTORINESS OF HIGH PURITY FUSED SILICA

BACKGROUND OF THE INVENTION

This invention relates to a method of producing fused silica of very high purity, and more particularly to a method of increasing the refractoriness of the silica by doping with controlled minute amounts of a selected metal oxide in conjunction with elemental silicon.

High purity fused silica can be produced from a number of different materials, and by various different procedures. A commercially used process involves vapor phase oxidation of silicon tetrachloride ($SiCl_4$) to silica. This process is generally described for example in U.S. Pat. No. 2,272,342 granted Feb. 10, 1942 to J. F. Hyde. Various other halides, silanes, and other volatile silicon compounds may be employed in lieu of the chloride. Alternatively, combustion processes such as are described in U.S. Pat. Nos. 2,823,982, granted Feb. 18, 1958 to O. Saladin et al., and No. 3,698,936, granted Oct. 17, 1972 to H. J. Moltzan may be employed. Also, hydrolytic processes starting with organic silicates are well known. The main factor in achieving a high purity level with any of these processes is the purity of the particular starting material selected.

The purity factor is very important in certain products such as the silica crucibles used in melting and drawing elemental silicon for semiconductor use. For such purposes alkali metal ions must be below 10 parts per million (ppm), and the transition metals must be below one ppm.

In addition to a high purity level, fused silica is frequently required to have a relatively high refractoriness or heat resistance. This characteristic is commonly identified with reference to the viscosity-temperature relationship of the ultimate vitrified silica. Glass annealing and strain points are commonly recognized and readily measured indicia of refractoriness or heat resistance.

PRIOR ART

Various techniques and materials for producing high purity fused silica have already been acknowledged.

It is also known that the addition of certain dopants will increase the viscosity of fused silica as indicated by an increase in the glass strain and annealing points. Thus, U.S. Pat. No. 3,848,152 granted Nov. 12, 1974 to P. C. Schultz discloses adding 100 to 10,000 ppm (0.01 to 1.0%), on a cation mole basis, of one or more selected dopant oxides for this purpose. However, these dopants, in such amounts, would be regarded as unacceptable impurity levels for many purposes and hence could not be used. Furthermore, they may increase devitrification tendencies in fused silica.

U.S. Pat. No. 3,370,921, granted Feb. 27, 1968 to F. E. Wagstaff, describes a method of enhancing the devitrification resistance of fused silica which consists in adding one hundred ppm (equivalent to 0.01% by weight) of elemental silicon to dried, powdered fused silica to produce, on firing, an oxygen deficient material that has an enhanced resistance to devitrification. No mention is made regarding the effect of such addition on any other properties of the material.

RELATED APPLICATIONS

Ser. No. 680,460, filed of even date herewith by P. P. Bihuniak and D. L. Guile, and entitled "Method of Enhancing the Refractoriness of High Purity Silica," discloses and claims the use of alumina and/or titania, preferably in conjunction with silicon, as a dopant to increase refractoriness of fused silica.

Ser. No. 680,459, filed of even date herewith by C. H. Baumgartner and P. P. Bihuniak, and entitled "Method of Enhancing the Refractoriness of High Purity Silica," discloses and claims the use of elemental silicon alone as a dopant to increase refractoriness of fused silica.

Ser. No. 680,061, filed of even date herewith by P. P. Bihuniak, L. H. Brandes, and D. L. Guile, and entitled "Method of Densifying Metal Oxides," discloses and claims a method of densifying fumed silica and of producing fused silica articles therefrom.

SUMMARY OF THE INVENTION

It is a primary purpose of the invention to provide a method of enhancing the refractoriness of fused silica. A more specific purpose is to enhance the refractoriness of high purity fused silica by controlled doping with minute amounts of a selected oxide in conjunction with elemental silicon. Another purpose is to provide a doped fused silica of otherwise high purity and having an enhanced refractoriness.

To these and other ends, our invention is an improved method of producing a high purity fused silica product, wherein a liquid flowable form of a silica sol or slurry is dried to form solid silica bodies which may then be thermally vitrified, the improvement, whereby the refractoriness of the fused silica is enhanced, comprising doping the silica containing liquid, and thereby the solid silica bodies, with 20 to 200 parts per million by weight as based on the fused silica, of a metal oxide selected from the group consisting of chromium, molybdenum, zinc and iron oxides in conjunction with up to 1500 ppm by weight of elemental silicon.

Any of the known sources of high purity silica may serve as a starting material for present purposes. These include, for example, hydrolyzed organosilicates, in particular ethyl silicates, hydrolyzed silicon tetrachloride, and an aqueous sol of fumed silica. The critical requirements are that the starting material have a requisite degree of purity, and be in the form of, or be capable of conversion to, a colloidal suspension in the nature of a silica sol or slurry.

A minute amount of one or more of the indicated metal oxides, in finely divided form is then thoroughly dispersed in the silica containing liquid in conjunction with the elemental silicon preferably by dispersion with a mechanical mixer. It has been found that while particle size is not critical, improved results are generally obtained with finer subdivision, and we prefer to use materials that either dissolve or that will pass through a 325 mesh screen (44 microns). While we use the term oxide, this is intended to include any oxide precursor such as decomposable metal salts (e.g. nitrates or carbonates) and oxidizable elemental metals. Also mixtures are contemplated. The silicon, however, must be in elemental form.

The silica containing liquid, also containing the dispersed dopants, is dried to produce doped silica fragments or chunks which are heat treated to prepare the silica for further processing. The heat treatment also causes the silicon to dewater, and the oxide dopant to become structurally incorporated within, the fused silica network, thus effecting, in combination, the desired increase in refractoriness as discussed subsequently. The silica fragments may be heated directly to vitrification temperatures if direct article forming, such as fiber formation, is desired. Alternatively, the fragments may be calcined in the temperature range of 1150° to 1500° C. preparatory to milling to a particle size suitable for slip casting.

The processing conditions are not critical. However, we prefer those described in companion application Ser. No. 680,061, filed of even date herewith by Bihuniak, Brandes and Guile. Briefly, the procedure of that application comprises delivering the silica containing liquid in a stream or layer customarily about ⅛ to ¼ inch in thickness and drying such stream to a rigid state. On further drying, the rigid material dices up into small particles, the size being generally dependent on thickness of the layer. When calcined at 1150° to 1500° C., these particles are of optimum size for wet milling with a casting medium to provide a slip for casting articles such as crucibles.

When sols, undoped with any additive, are dried and ultimately converted into fused silica glass bodies, the glasses are found to have annealing points that may vary from about 1000° C. to somewhat higher than 1100° C. depending on the raw material source, the previous firing conditions and other factors. Correspondingly, the strain points vary from about 900° C. to somewhat higher than 1000° C.

It has been shown in companion application Ser. No. 680,459 that indicia of viscosity can be raised a substantial amount when elemental silicon is incorporated as an additive in a silica sol in amounts of at least 200 parts per million by weight. We have now discovered that certain metal oxides further enhance fused silica refractoriness, to a substantial degree, as demonstrated by substantially increased annealing and strain points, when they are added in conjunction with the silicon in minute amounts as a combination fused silica dopant.

We have found that less than twenty parts per million of certain of these oxides can have an appreciable effect. This is enhanced somewhat with larger amounts; also, larger amounts of heavier oxides may be required for equivalent results. Further, such small amounts are difficult to control and disperse uniformly. Accordingly, we find that optimum results are generally obtained at about 20-200 parts per million, depending on the selected oxide, and that larger amounts provide no benefits and may even diminish somewhat in effectiveness. Also larger amounts introduce purity problems, and increase devitrification tendencies. Our oxide dopant is measured on a cation or metal basis, rather than an oxide basis, and zinc oxide appears to be the most effective oxide additive and, hence, represents a preferred embodiment.

The effective form of dopant is believed to be the oxide. However, it is not necessary to add the dopant in this form. Thus, as pointed out earlier, decomposable salts, such as nitrates and carbonates, may be used. These may be particularly useful where they are water soluble. Alternatively, we have used elemental metals in finely divided form. The requisite then appears to be an oxide precursor in sufficient amount to provide the prescribed amount of oxide.

We have further found that the present dopants do not replace silicon. Rather, we have found a cooperative or complementary effect occurs, at least insofar as refractoriness is concerned, as indicated by substantial increases in annealing and strain points. Unlike other oxide dopants, particularly alumina, the present oxides do not appear to impart a substantial increase in refractoriness by themselves, that is absent silicon, except in relatively large amounts as indicated by the Schultz patent mentioned earlier.

Even small amounts of silicon are effective to some extent. However, we generally prefer at least 200 ppm, and usually somewhat larger amounts when the material is calcined in a gas fired oven where the atmosphere tends to contain moisture. Large amounts tend to produce little or no added advantage, and we prefer not to exceed about 800 ppm silicon.

As explained in companion application Ser. No. 680,459, it is believed that the silicon dopant reacts with structurally bound hydroxyl ions (also referred to sometimes as residual water), liberating hydrogen and tying up the otherwise open or weak silica structure. This belief is supported by so-called $B_{OH}$ data, that is, —OH vibrational stretching absorption coefficients located at 2.73 microns, as a measure of retained hydroxyl ions (water). It is possible that the oxides also exert an influence on hydroxyl ion retention. However, available data do not tend to support this theory.

We prefer then to explain the oxide effect in a different manner. In the minutely small concentrations involved here, the dopant oxides may be substitutional in character within the fused silica network. That is to say, they may behave as 4-coordinated network formers, thus associating with previously weakened sites in the silica structure, that is, sites of non-bridging oxygens. This tying up of the structure would tend to raise viscosity. However, as more dopant is added, we believe the dopant tends to revert back to its normal network modifying role, whereby viscosity is either unaffected or somewhat decreased.

SPECIFIC EMBODIMENTS

EXAMPLES 1–4

A series of aqueous silica sols was prepared by mixing, in a paddle type food mixer, fumed silica and water in a weight ratio of about 3:7, thus providing about 30% by weight silica in each sol sample prepared. The fumed silica was a commercial product characterized by a surface area of about 200m²/gram and a density of 4 lbs./cu. ft. In each case, the fumed silica and water were mixed for several minutes at high speed to obtain a well-dispersed flowable sol having a viscosity of a few hundred centipoises.

Prior to mixing, a combination of finely divided (less than 44 microns) elemental silicon and a selected metal oxide, calculated as the oxide by weight based on the fused silica, was added as a dopant to each sol. In this series, the silicon addition was held constant at 500 ppm, by weight as based on total solids, while the selected metal oxide and the amount by weight was varied in amount as shown in parts per million (same basis) in Table I below. The doped silica batches thus prepared were mixed for a sufficient time (15–20 minutes) to provide a uniform dispersion of the dopants in a thin watery sol.

The sols were individually poured onto drying trays consisting of a flat rectangular plate having one-eighth inch peripheral barriers, whereby a layer of the sol in such depth was contained on the tray. The tray was placed over an electrically heated plate of approximately the tray dimensions and the layer of sol dried by heating just below the boiling point. As each doped sol dried, it became rigid, contracted, and then fragmented into small pieces about the size of the layer thickness. These pieces were collected and calcined in an electric oven (dry atmosphere) at about 1350° C. for ½ hour to densify the material. Subsequently, the calcined fragments were placed in a ball mill and milled with a casting medium to form a casting slip. The slip was cast to produce "green" bodies (test blocks) which were divided into two lots. One lot was calcined by heating for one hour in an electric fired oven at 1100° C.; the other by heating for one hour in a gas fired oven at 1100° C. The calcined bodies were then vitrified in a final firing for five to seven minutes at about 1800° C. in a helium-argon atmosphere.

The fused silica glasses thus produced were subjected to various measurements, the data being recorded in the Table below which also identifies the selected oxide and the amount for each sample. The measurements included annealing point (Ann. Pt.) in degrees C., and residual water or hydroxyl ion in terms of $B_{OH}$. The latter is a value calculated from transmission ($T$) measurements at 2.73 micron wavelength, and glass thickness ($t$) in mm., the value being calcined from the formula:

$$B_{OH} = \frac{1}{t} \log_{10} \frac{T}{T_o}$$

wherein $T$ is transmission of 2.73 wavelength radiation in a sample, and $T_o$ is the corresponding transmission in a theoretically dry glass.

TABLE

| Example | Dopant Oxide | Gas Fired Wt. (ppm) | Ann. Pt. (° C.) | $B_{OH}$ |
|---|---|---|---|---|
| 1 | $Cr_2O_3$ | 130 | 1158 | .105 |
| 2 | $MoO_3$ | 89 | 1180 | .120 |
| 3 | ZnO | 32 | 1176 | .119 |
| 4 | $Fe_2O_3$ | 180 | 1158 | .121 |

| Example | Dopant Oxide | Electric Fired Wt. (ppm) | Ann. Pt. | $B_{OH}$ |
|---|---|---|---|---|
| 1 | $Cr_2O_3$ | 160 | 1197 | .002 |
| 2 | $MoO_3$ | 120 | 1210 | .004 |
| 3 | ZnO | 19 | 1191 | — |
| 4 | $Fe_2O_3$ | 180 | 1215 | .002 |

EXAMPLES 5-6

Fused silica test pieces were prepared in essentially identical manner to that described above, except that silicon was omitted as a dopant, that is only an oxide dopant was added. In Example 5, 28 ppm ZnO was added and resulted in no substantial change. Thus an electric fired sample showed an annealing point of 1128° C. as compared to 1107° C. in an undoped sample, while no significant difference was observed between doped and undoped when gas fired. The electric fired, doped sample showed a $B_{OH}$ value of 0.070, indicating some reduction in water content, but not nearly the degree attained with silicon present.

In Example 6, 75 ppm of $MoO_3$ were added as molybdenum metal. In the gas fired sample, this also produced no apparent change in annealing point, although the electric fired sample showed an annealing point of 1128° C. and a $B_{OH}$ value of 0.057. It is apparent that the combination effect of silicon plus the oxide provides a synergistic effect in some manner.

We claim:

1. In an improved method of producing a high purity fused silica product, wherein a liquid form of silica sol or slurry is dried to form solid silica bodies which are then thermally vitrified, the improvement, whereby the refractoriness of the fused silica is enhanced, which comprises doping the silica containing liquid with 20 to 200 parts per million by weight, as based on the fused silica, of a metal oxide selected from the group consisting of chromium, molybdenum, zinc, and iron oxides in conjunction with up to 1500 parts per million by weight of elemental silicon.

2. A method in accordance with claim 1 wherein the selected oxide is zinc oxide.

3. A method in accordance with claim 1 wherein the elemental silicon is in the range of 200 to 800 parts per million.

4. A method of producing a high purity fused silica product which comprises the steps of doping a liquid form of silica sol or slurry with 20 to 200 parts per million by weight, as based on the fused silica, of a metal oxide selected from the group consisting of chromium, molybdenum, zinc and iron oxides in conjunction with up to 1500 parts per million by weight of elemental silicon, drying the doped source of silica to rigid silica fragments containing the dopant dispersed therein, and calcining the silica fragments at about 1150°-1500° C.

5. A method in accordance with claim 4 wherein the selected oxide is zinc oxide.

6. A method in accordance with claim 4 wherein the elemental silicon is in the range of 200 to 800 parts per million.

7. A method in accordance with claim 4 wherein the calcined product is milled to form a slip which is cast in a mold and the product thus formed is fired to a fused silica body of corresponding shape.

8. A method of enhancing the refractoriness of a fused silica product, which comprises doping a liquid form of silica sol or slurry with 20 to 200 parts per million by weight, as based on the fused silica, of a metal oxide selected from the group consisting of chromium, molybdenum, zinc and iron oxides in conjunction with up to 1500 parts per million by weight of elemental silicon, to form solid silica bodies, and firing said silica bodies to a fused silica product.

9. A method in accordance with claim 8 wherein the elemental silicon is in the range of 200 to 800 parts per million.

* * * * *

UNITED STATES PATENT AND TRADEMARK OFFICE
CERTIFICATE OF CORRECTION

PATENT NO. : 4,028,124

DATED : June 7, 1977

INVENTOR(S) : Peter P. Bihuniak and Donald L. Guile

It is certified that error appears in the above-identified patent and that said Letters Patent are hereby corrected as shown below:

Column 6, Claim 8, line 54, after "silicon," insert -- drying the doped source of silica --.

Signed and Sealed this

Thirteenth Day of December 1977

[SEAL]

Attest:

RUTH C. MASON
Attesting Officer

LUTRELLE F. PARKER
Acting Commissioner of Patents and Trademarks